United States Patent
Bolik et al.

(10) Patent No.: US 7,921,246 B2
(45) Date of Patent: Apr. 5, 2011

(54) AUTOMATICALLY IDENTIFYING AVAILABLE STORAGE COMPONENTS

(75) Inventors: Christian Bolik, Oldenburg (DE); Nile Haustein, Soergenioch (DE); Einar El Lueck, Weil im Schoenbuch (DE); Dietmar Noll, Bad Soden-Salm (DE)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 12/338,139

(22) Filed: Dec. 18, 2008

(65) Prior Publication Data
US 2009/0313395 A1      Dec. 17, 2009

(30) Foreign Application Priority Data
Jan. 15, 2008    (EP) ..................................... 08100481

(51) Int. Cl.
*G06F 3/00* (2006.01)
(52) U.S. Cl. ................. 710/74; 710/8; 710/15; 709/232
(58) Field of Classification Search ........................ None
See application file for complete search history.

(56) References Cited

U.S. PATENT DOCUMENTS

| | | |
|---|---|---|
| 5,239,647 A | 8/1993 | Anglin et al. |
| 5,946,660 A | 8/1999 | McCarty et al. |
| 7,093,088 B1 | 8/2006 | Todd et al. |
| 7,653,781 B2 * | 1/2010 | Dawkins ..................... 711/114 |
| 2003/0135609 A1* | 7/2003 | Carlson et al. ............... 709/224 |
| 2006/0236061 A1* | 10/2006 | Koclanes ..................... 711/170 |

OTHER PUBLICATIONS

Haripriyan et al., A Structured Model For Service Level Management, Nov. 28, 2007, pp. 1-10.*
Gencay et al., Towards SLA-Based Optimal Workload Distribution in SANs, IEEE, 2008, pp. 1-4.*

* cited by examiner

*Primary Examiner* — Eron J Sorrell
(74) *Attorney, Agent, or Firm* — Richard M. Kotulak (57) ABSTRACT

A method for automatically identifying available storage components within a storage system, which are appropriate for storing consumer data in compliance with specified service level objectives (SLOs), including discovering available storage components; identifying and assigning service levels provided by each available storage component, wherein identifying and assigning service levels provided by each available storage component, includes classifying the available storage components based on their type of technology, and determining the SLO relevant capabilities of the available storage components; and storing resultant mapping of service levels to available storage components in a metadata repository.

20 Claims, 7 Drawing Sheets

AUTOMATICALLY IDENTIFYING AVAILABLE STORAGE COMPONENTS

BACKGROUND OF THE INVENTION

Figure 1:
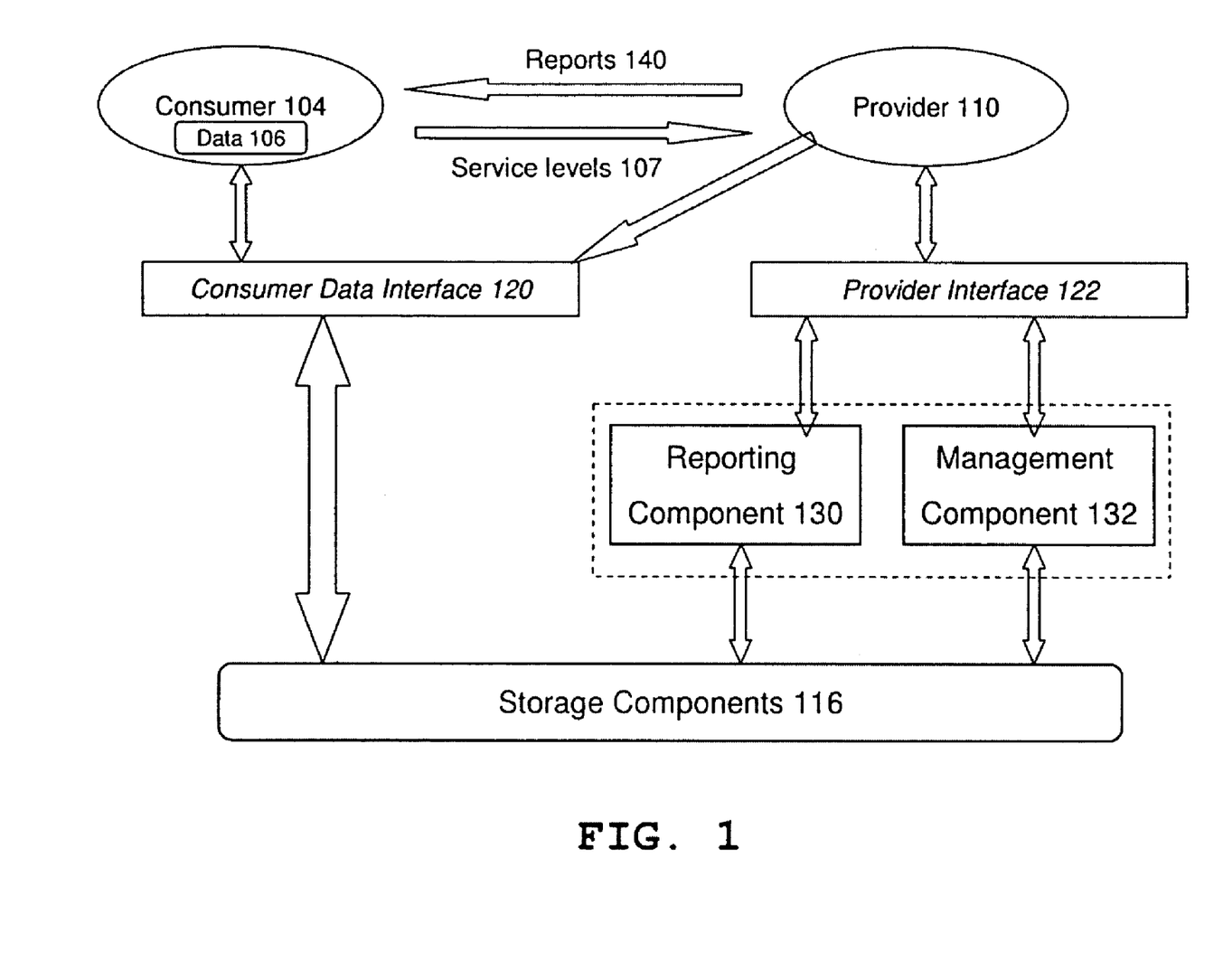
FIG. 1, shows a diagram illustrating an example storage infrastructure as background.

Existing storage infrastructures, such as the storage infrastructure shown in FIG. 1, are provided and managed by a provider 110 and used by at least one consumer 104. Consumer 104 in this context is a person or organization which stores data 106 under consideration of different service levels 107. Therefore, the storage infrastructure comprises storage components 116. The term storage components here refers to both, storage devices providing capacity and data access, as well as storage software dealing with these devices or the data. Such storage software, according to existing storage infrastructures, may includes functions to virtualize storage infrastructure, management functions, configuration functions, monitoring and reporting functions and alerting function. The data 106 is stored via a consumer data interface 120 in the storage components 116. Besides, the consumer 104 provides service levels 107 for his data to the provider 110, what is manifested in a service level agreement (SLA).

A provider 110 in this context is a person or organization which provides and manages the storage infrastructure and ensures that the service levels 107 are met. Consumer 104 and provider 110 can be one and the same organization or enterprise or they can be of different enterprises. Service levels 107 in this context are measurable properties used to describe the consumer's requirements for the storage of his data 106. For example, one service level may describe the initial access time for data which can be measured in seconds. The storage components 116 selected must fulfill the consumer specified service levels 107.

The management of the storage infrastructure comprises mapping, selecting and configuring storage components 116 according to service levels 107, measuring achievement of service levels 107 and providing corresponding reports 140 as well as acting upon failures to meet service levels 107. Therefore, the storage infrastructure comprises a management component 132 and a reporting component 130, which are accessible to the provider 110 via a provider interface 122.

In a storage infrastructure as described above most of these management tasks have to be carried out manually. Especially, the provider 110 has to map the consumer service levels 107 to storage components 116. The provider 110 has to manually configure the storage components 116 based on the service levels 107 via the management component 132. The provider 110 has to ensure that the service levels 107 are met. Therefore, he has to monitor the system and act upon failures to meet service levels 107. The provider 110 also has to generate reports 140 via the reporting component 132 based on consumer service levels 107 and he has to charge the consumer 104 based on these reports 140. Additionally, the provider 110 has to provide the capacity requested by the consumer 104, even though the consumer 104 may not initially require the requested amount. This results in a waste of storage resources. In such consumer-provider model the provider is very dependent on his human resources (manpower) to map, select, provision, configure, monitor, correct and report a storage infrastructure. Besides, this consumer-provider model is prone for mistakes, which can become expensive for the provider. This is particularly important for outsourcing contracts.

Data Facility System Managed Storage (DFSMS)—which allows the automated mapping of data to storage components based on predefined policies (also called ACS routines). Such policies are predefined by the user and do not actually reflect the capabilities of the underlying storage infrastructure. However, DFSMS is very limited in the service levels it supports, and it does not allow for automated mapping between service levels and storage components. Additionally, DFSMS does not monitor the achievement of service levels and perform corrective actions.

SUMMARY OF THE INVENTION

In general, the present invention relates to the identification of available storage components within a storage system, which are appropriate for storing consumer data and identifying and assigning service levels provided by such storage components. Storage systems usually comprise several storage components for storing consumer data providing tangible service levels. These service levels provided by the storage components can be matched against service level objectives specified by the consumer. Consumer specified service level objectives (SLOs) can be applied for consumer specified data classes. Besides, such storage systems comprise at least one consumer data interface and at least one provider interface.

According to one embodiment of the invention, a method for automatically identifying available storage components within a storage system, which are appropriate for storing consumer data in compliance with specified service level objectives (SLOs) is provided, including discovering available storage components; identifying and assigning service levels provided by each available storage component, wherein identifying and assigning service levels provided by each available storage component, includes classifying the available storage components based on their type of technology, and determining the SLO relevant capabilities of the available storage components; and storing resultant mapping of service levels to available storage components in a metadata repository.

According to another embodiment of the invention, a storage infrastructure which is provided and managed by a provider and used by at least one consumer is provided, including storage components for storing consumer data under consideration of consumer specified service level objectives (SLOs) for consumer specified data classes; at least one consumer data interface; at least one provider interface; and wherein the storage infrastructure is characterized by a component discovery and classification module for identifying available storage components and according service levels appropriate for storing consumer data in compliance with specified SLOs; and by at least one repository for storing metadata associated with the storing of consumer data under consideration of SLO policies.

According to yet another embodiment of the invention, a computer program product stored on a computer usable medium, including computer readable program means for causing a computer system to perform a method for automatically identifying available storage components within a storage system, which are appropriate for storing consumer data in compliance with specified service level objectives (SLOs) is provided, and the computer program product includes computer usable program code for discovering available storage components; computer usable program code for identifying and assigning service levels provided by each available storage component, wherein identifying and assigning service levels provided by each available storage component, includes classifying the available storage components based on their type of technology, and determining the SLO relevant capabilities of the available storage components; and computer usable program code for storing resultant mapping of service levels to available storage components in a metadata repository.

BRIEF DESCRIPTION OF THE DRAWINGS

The novel features of the invention are set forth in the appended claims. The invention itself, however, as well as a preferred mode of use, will best be understood by reference to the following detailed description of an illustrative embodiment when read in conjunction with the accompanying drawings, wherein:

DETAILED DESCRIPTION

Figure 2:
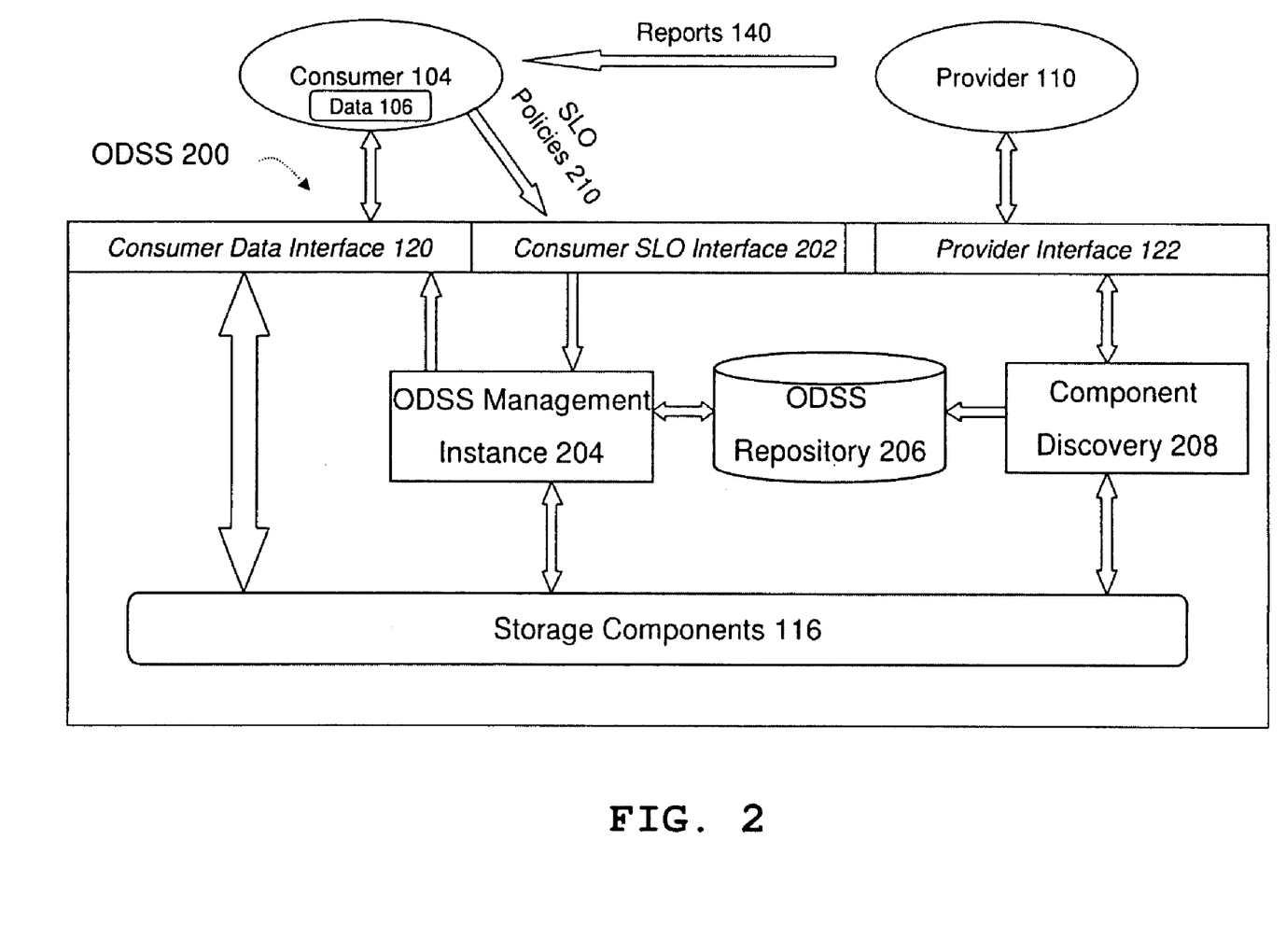
FIG. 2, shows a diagram illustrating the basic concept of an On Demand Storage System (ODSS)

Before explaining in detail the On Demand Storage System (ODSS 200), illustrated in FIG. 2, it should be pointed out here, that the ODSS 200 is only one exemplary storage infrastructure for implementing the present invention. For a person skilled in the art it should be obvious that the claimed method for automatically identifying available storage components may likewise be applied in the context with other storage infrastructures.

As the storage infrastructure shown in FIG. 1, the ODSS 200 illustrated in FIG. 2 comprises a plurality of storage components 116, which are accessible for a consumer 104 via a consumer data interface 120. The ODSS 200 further comprises a provider interface 122 for communication with the provider 110.

The specific functionality of the ODSS 200 is provided by a separate consumer SLO interface 202, an ODSS management instance 204, an ODSS repository 206 and a component discovery and classification (CDC) component 208.

According to the concept of the ODSS 200 the consumer 104 defines data classes and assigns SLOs to these data classes, thus forming SLO policies 210. The data classes can be derived from applications the consumer is using. For example, the consumer may be using an e-mail system defining a data class 1 with certain service levels and the consumer may be using an ERP system defining a data class 2 with certain service levels. Thus, the data classes can be derived from the different applications. Alternatively, there can be multiple data classes for one application, for example a data based application may have one data class for the recovery logs and one data class for the actual data. Associated service levels are determined by the consumer and entered into subject application or a separate application via a user interface.

These SLO policies 210 are transmitted to the ODSS 200 via the consumer SLO interface 202 and are automatically managed by the ODSS management instance 204.

The data 106 from the consumer 104 is transmitted to the ODSS 200 via the consumer data interface 120. The transmission of data occurs according to well known methods and protocol such as the SCSI protocol, the fiber channel protocol or the Infiniband protocol. The ODSS 200, more precise the ODSS management instance 204 ensures that the data 106 is stored on an appropriate storage component 116 satisfying the SLOs. The provider 110 ensures that the ODSS 200 is working properly via the provider interface 122 and provides the necessary storage components 116 in order to satisfy the SLO policies.

It should be mentioned here, that the word instance is used in association with the ODSS because an ODSS may manage multiple instances, one for each consumer or one for each consumer SLO policy. The ODSS management instance 204 automatically maps the consumer SLO policies to the appropriate storage component 116 based on a component classification done by the CDC component 208. Besides, the ODSS management instance 204 automatically configures the storage component 116 according to the SLO policies and assigns the consumer data interface 120 to the consumer. Furthermore, the ODSS management instance 204 monitors the consumer data interface 120 and the storage components 116 in order to verify that the SLOs are met. If this is not the case, it derives corrective actions. Additionally, the ODSS management instance 204 performs dynamic changes to the storage components 116 upon changes of the SLO policies. Changes of the SLO policy can occur when the consumer requirements change and subsequently the consumer changes the SLOs or when the SLO-policies comprise time-dependent parameters. For example, an SLO policy may include a time period after which an SLO changes. Changing the SLO policy may also include moving the data to another storage component 116, automatically and transparent to the consumer data interface 120. Based on achieved service levels during a predefined period the ODSS management instance 204 generates reports 140. These reports 140 may include chargeback reports which may be generated based on a predefined charging model.

The CDC component 208 of the ODSS 200 basically discovers storage components 116 available to the ODSS 200 and classifies them according to service levels provided by these storage components 116. Then, the discovered storage components 116 together with the associated SLOs provided by such storage components 116 are stored in the ODSS Repository 206 as Component Service Level Catalogue (CSLC). Besides, the CDC component 208 includes methods for a policy-based activation of component discovery. These policies can be selected by the provider 110 and can be given different priorities. Such policies for activation of discovery are for example upon SLO breaches or automatically when new storage components are added to an ODSS. The discovery can also be manually triggered by the provider.

The ODSS repository 206 is used to store the metadata associated with an ODSS system. Metadata includes, but is not limited to the following data:

SLO Policies 210 (SLO-Data Mapping) provided from consumer

SLO-Component mapping which maps the SLOs comprised in SLO-policies to storage components Storage component related information such as service levels provided by a storage component, its capacity and technical specification SLO Measurement results Audit data provided by all ODSS management instances Charging model created by the provider Chargeback reports Storage component-Service Level Catalogue provided by CDC component 208 (CSLC: Storage Component— SLO mapping).

The ODSS architecture 200 shown in FIG. 2 enables the following automated methods provided by the main ODSS components ODSS management instance 204, ODSS repository 206, CDC module 208 and consumer SLO interface 202:

1. Automated storage component discovery and service level identification and assignment
2. Automated mapping of consumer SLO policies 210 to storage components 116
3. Automated configuration of storage components 116 based on the mapping of consumer SLO policies 210 to storage components
4. Automated monitoring, metering and comparison of configured SLOs to actual SLOs and subsequent provider notification and adjustment of data placement and management based on SLO breaches
5. Lifecycle Management based on SLO changes
6. Automated generation of chargeback reports based on charging models, e.g., to charge for how much data received which kinds of service levels for what period of time
7. Just-in-Time capacity provisioning based on historic data and policies.

Figure 6:
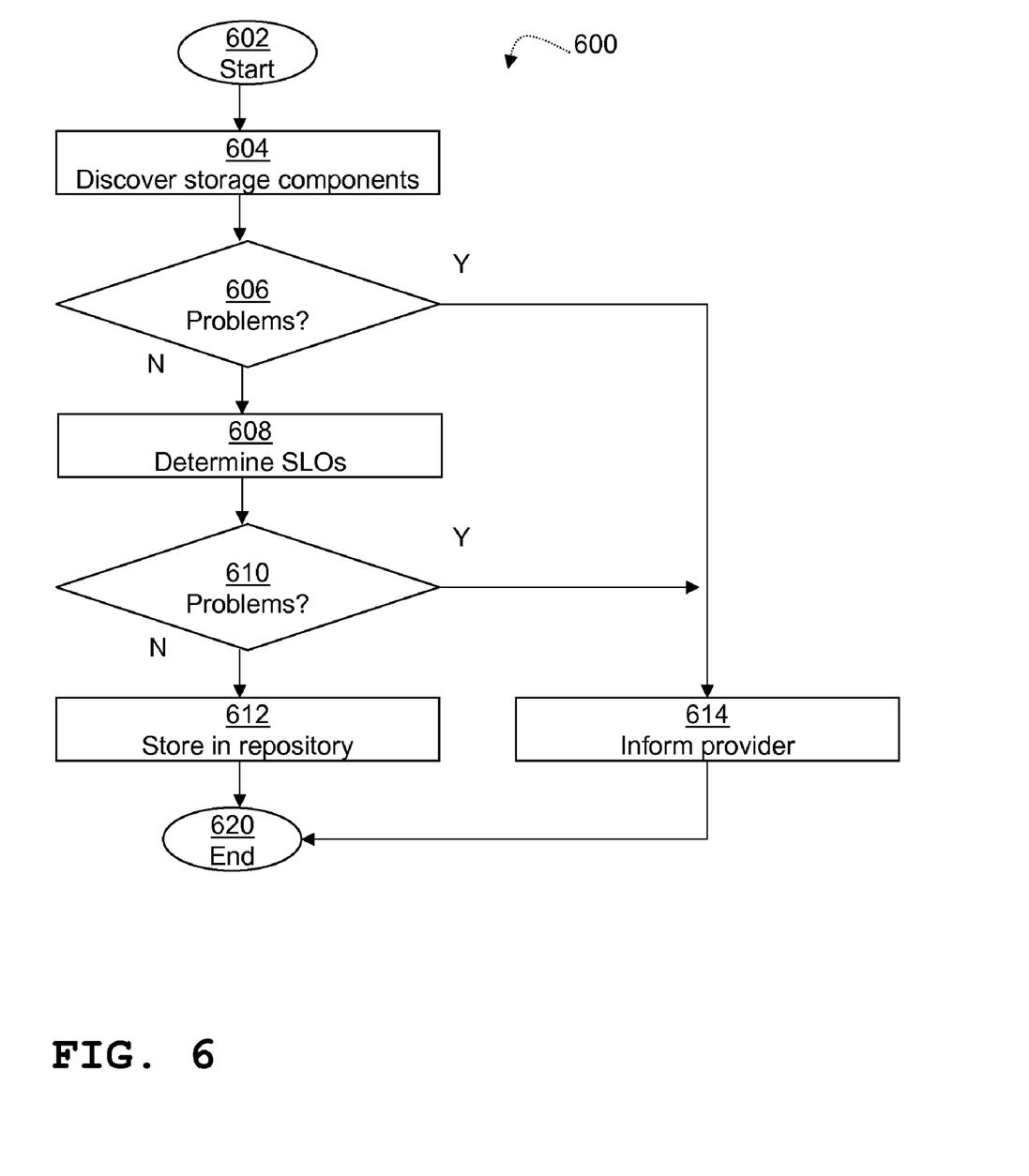
FIG. 6, shows a flowchart illustrating a process for storage component discovery and classification according to the invention.

The flowchart of FIG. 6 illustrates a process 600 for automated storage component discovery and service level identification and assignment which is executed by the CDC component 208 of the ODSS 200 shown in FIG. 2.

Process 600 starts in step 602. There are various possibilities to initiate the automated discovery and classification of storage components. For better understanding they will be discussed after having explained the whole process 600.

In step 604 storage components 116 available to the ODSS 200 are discovered. The discovery of storage components is based on well known techniques and can happen in-band or out-of band. A typical in-band discovery can be based on the SCSI Inquiry command. A typical out-band discovery can be based on a management interface and protocol such as SMI-S.

In step 606 it is determined whether there were problems to discover such storage components. If the answer in step 606 is yes then the process flows to step 614, where a message is sent to the provider informing him about the problem. This message might be sent via e-mail, SNMP or other well known reporting protocols. Consequently, the provider may repair problems in discovering storage components.

If the answer in step 606 is no the process flows to step 608 where for each discovered storage component the associated service levels are determined. This mapping is often based on a classification of the discovered storage components according to their type of technology such as disk, tape and optical. Under each type, there can be subtypes such as:

Type Disk:
  Fiber Channel disk
    Mirrored disk
    RAID protected disk
  SATA
    Mirrored disk
    RAID protected disk
  Disk File System or network attached storage
    Mirrored disk
    RAID protected disk
Type Tape:
  Short tape
    WORM tape
    Encryption Tape
  Long tape
    WORM tape
    Encryption Tape
Type optical
  UDO
    WORM protected
  Blue Ray
    WORM protected It should be mentioned here that the number of types and subtypes is not limited by this invention. Then, the mapping of service levels to the discovered storage components can be based on a predefined mapping of storage component device type to service levels. E.g. a disk has an initial access time of <1 second.

In an alternate embodiment the determination of the service levels is based on actual tests executed in this step. For example the CDC component 208 may store test data on a discovered storage component 116 and measure the SLO initial access time and the SLO throughput. However, not all SLOs can be tested this way.

The mapping of storage components can also be based on reporting capabilities of an individual storage component in case that the storage component is able to report the service levels it can achieve. This reporting can be done via the provider or data interface and via the storage component interface. For example a fiber channel disk system can report some service levels via the SCSI LOG Sense command or via SMI-S protocol (SNIA's Storage Management Initiative-Specification).

In step 610 the determination is made if there were problems to determine service levels for discovered storage components. If the answer in step 610 is yes then the process flows to step 614, where a message is sent to the provider informing him about the problem. Again, the message might be sent via e-mail, SNMP or other well known reporting protocols. Consequently, the provider may also repair problems in determining service levels for discovered storage components. From step 614 the process flow to the ending step 620.

If the answer in step 610 is no the process flows to step 612 where the mapping of discovered storage components (step 604) to the service levels (step 608) is stored in the ODSS repository 206 as Component-Service Level Catalogue (CSLC). This CSLC is used by other ODSS management components, what is explained in connection with FIGS. 2 and 3 to 5. Table 1 shows an exemplary entry of an CSLC:

TABLE 1

Example for storage components to SLO mapping (CSLC)

| Component Number | Component Type | Date Interface | SLO | Maximum capacity |
|---|---|---|---|---|
| 1 | Disk: Disk File System: mirrored | NFS/CIFS | Access Time < 1 sec<br>Throughput < 30 MB/sec<br>RTO = 4 hours | 100 TB |
| 2 | Disk: Fiber Channel: mirrored | Fiber Channel | Access Time < 1 sec<br>Throughput~80 MB/sec<br>RTO < 2 hours<br>RPO < 10 minutes | 200 TB |

The second row in Table 1 contains an exemplary entry generated by the CDC component 208. Each storage component has a number in order to allow its unique identification (column "component number"). The first entry specifies a mirrored disk file system (column "component type") providing an NFS/CIFS based data interface (column "Data Interface") and the service levels provided by that component are given in the last column (column SLO). There might also be more service levels associated with that storage component. The third row in Table 1 contains another exemplary entry generated by the CDC component. Therewith, a mirrored fiber channel disk system (column "component type") is specified providing a fiber channel based data interface (column "Data Interface"). The service levels provided by that storage component 2 are given in the last column (column SLO). To go without saying there may be more entries in that mapping Table 2. Also, the mapping of storage components and service levels may include all possible configurations of storage components and SLOs. For example a file system can be configured with different RPO dependent on the number of copies and the copy mode. Associated configuration specific details are included in this mapping.

As mentioned above, in step 614 a notification is posted to the provider in case that the automated assigning of service levels to storage components is not possible for all discovered storage components. In this context it should be mentioned, that the CDC component 208 also offers the possibility to update the CSLC manually.

Process 600 described above is initiated in step 602. In a first embodiment of the present invention this can be done manually by the provider. In another advantageous embodiment the CDC component triggers process 600 on a regular base in the background. This way the CSLC is updated periodically. The CDC component 208 may also include methods for a policy-based activation of component discovery and classification. These policies may comprise different methods which can be selected by the provider and which can be prioritized. One method triggers process 600 whenever an SLO breach has been detected by the ODSS management instance 204. Another method triggers process 600 whenever new storage components have been added to the ODSS and/or whenever storage components of the ODSS have been removed or changed. Yet another method triggers process 600 after repair action or firmware updates for storage components comprised in the ODSS.

The ODSS 200 allows the automated mapping of consumer SLO policies 210 to storage components 116 and the corresponding configuration of the storage components. These aspects are explained in the following referring again to FIG. 2 and later to FIG. 7.

The consumer defines SLO policies 210 wherein each policy comprises a unique data class and the associated service levels required by the consumer. The SLO policy 210 is passed from the consumer computing system 104 to the ODSS 200 via a consumer SLO interface 202. That interface 202 can be based on Ethernet and the TCPIP protocol. This interface 202 may implement a protocol allowing exchange of SLO policies 210 based on the SLO policy structure. The ODSS 200 checks whether the requested SLO policy +can be provided by the system. Therefore, it compares the requested SLOs with the SLOs provided using the Component-Service-Level-Catalogue (CSLC). If the SLOs requested by the consumer cannot be satisfied then the ODSS 200 informs the consumer about this via the interface 202 utilizing the associated protocol.

The SLO policy structure is exemplarily presented in Table 2, especially by the columns of Table 2:

TABLE 2

Exemplary SLO policies

| SLO policy number | Unique Data Class | Data Interface | Service Level | Capacity per time period |
|---|---|---|---|---|
| 1 | E-Mail | NFS via Ethernet (mount point/e-mail) | Access time < 1 sec Throughput = 20 MB/sec RTO < 4 hours | 100 GB/year |
| 2 | E-Mail | NFS via Ethernet | Access time after 1 year < 30 sec | 100 GB/year |

The first column of Table 2 is dedicated for an SLO policy number representing a unique identification for each SLO policy. The second column indicates the unique data class of the corresponding SLO policy and the third column lists the data interface for that data specifying the protocol and interface type. In the fourth column the service levels are listed which have to be met for that data class. And the fifth column lists the capacity required in a certain time period. Each row of Table 2 represents one SLO policy. It is understood that there may be multiple SLO policies for one data class.

In the example of Table 2, the data class e-mail must meet the following service levels: initial access time <1 seconds, throughput >=20 MB/sec, recovery time objective <4 hours. This policy (number 1 in Table 2) requires 100 GB per year of capacity and must be accessible via NFS with a mount point of /e-mail). In the third row another SLO policy for data class e-mail is listed and specifies that the access time can be <30 seconds when the e-mail is 1 year or older.

As the SLO policies 210 are transmitted to the ODSS 200 via the consumer SLO interface 202 and stored in the ODSS repository 206 the ODSS management instance 204 is able to map this SLO policies 210 to storage components 116 which have previously been discovered and classified by the CDC component 208. Therefore the SLO policies are compared with the information given by the CSLC.

Figure 7:
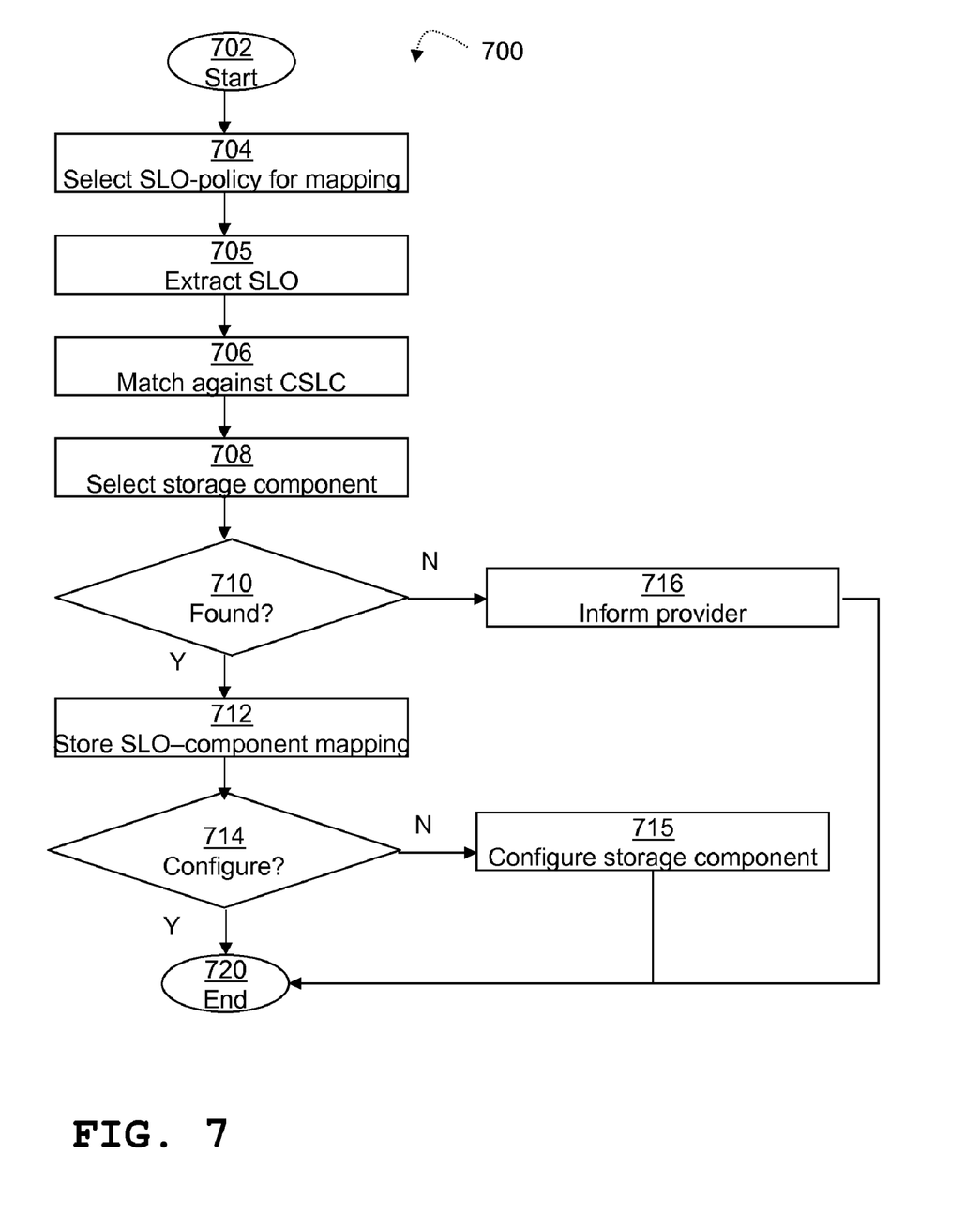
FIG. 7, shows a flowchart illustrating a process for the mapping of SLO-policies to storage components.

The automated mapping of SLO-policies to storage components is further described in process 700 of FIG. 7. Process 700 starts in step 702. The start of process 700 is triggered when an SLO-policy is received via the SLO interface 202. Process 700 may also be triggered by processes 300 of FIG. 3 and 400 of FIG. 4.

In step 704 the SLO policy to be mapped against a storage component is selected from the ODSS repository 206. Selected SLO-policy includes one or more SLOs. For example SLO-policy number 1 according to Table 2 may be selected.

In step 705 the SLOs comprised in SLO-policy are extracted. For example the SLOs for SLO-policy number 1 of Table 2 are: access time <1 sec; throughput=20 MB/sec and RTO <4 hours.

In step 706 the SLOs extracted in step 705 are matched against the Component-Service-Level-Catalogue which has been created by the component discovery component 208 and stored in ODSS repository 206. Thereby all SLOs pertaining to selected SLO-policy must match the SLOs provided by a storage component according to Table 1. For example the SLOs pertaining to SLO-policy number 1 of Table 2 are matched against the SLOs of the storage component number 1 of Table 1.

In step 708 the storage component is selected where the SLOs, the data interface and capacity match between the SLO-policy (Table 1) and storage component SLO (Table 2).

In step 710 it is checked if a storage component was selected in step 708. If the answer is no the process flows to step 716 where a notification is sent to the provider. Then, the provider has the possibility to manually map the SLO policy to a storage component, or the provider can install additional storage components to meet such SLO policies. The notification to the provider is done via provider interface 122 and can for example be based on e-mail, SNMP traps or SMI-S specific messages. From step 716 the process flows to the ending step 720.

If the answer in step 710 is yes indicating that a storage component matching the SLOs for the SLO-policy selected in step 704 has been found the process flows to step 712. In step 712 the process stores the mapping of SLO-policy to storage component in the ODSS repository as SLO-Component mapping.

In step 714 the decision is made whether the selected storage component is to be automatically configured. If the answer in step 714 is yes then the process flows to step 715 where the configuration of the selected storage component is done. The configuration of a storage component is usually done through a management interface of the storage component such as a command line interface allowing automation. The ODSS management instance has knowledge of the management interface and the associated protocol. For example the component number 1 of Table 1 is being configured with a NFS file system with mount point /email and 100 GB capacity. In addition mirroring of this system is configured to assure a RTO <4 hours. In a preferred embodiment of the present invention also the mount point (/email) is mounted automatically at the consumer data interface 120 by the ODSS management instance 204, i.e. by executing remote commands (rexec) at the consumer computing system. In an alternate embodiment the ODSS management instance 204 informs the provider 110 via provider interface 122 about the completion of the configuration and provides details about the mount point. From step 715 the process flows to ending step 720.

If the answer in step 714 is no the process flows to the ending step. This may be the case when process 700 is invoked by processes 300 and 400 which are explained later. In the ending step the mapping of the SLO-policy to a storage component has been completed.

Figure 3:
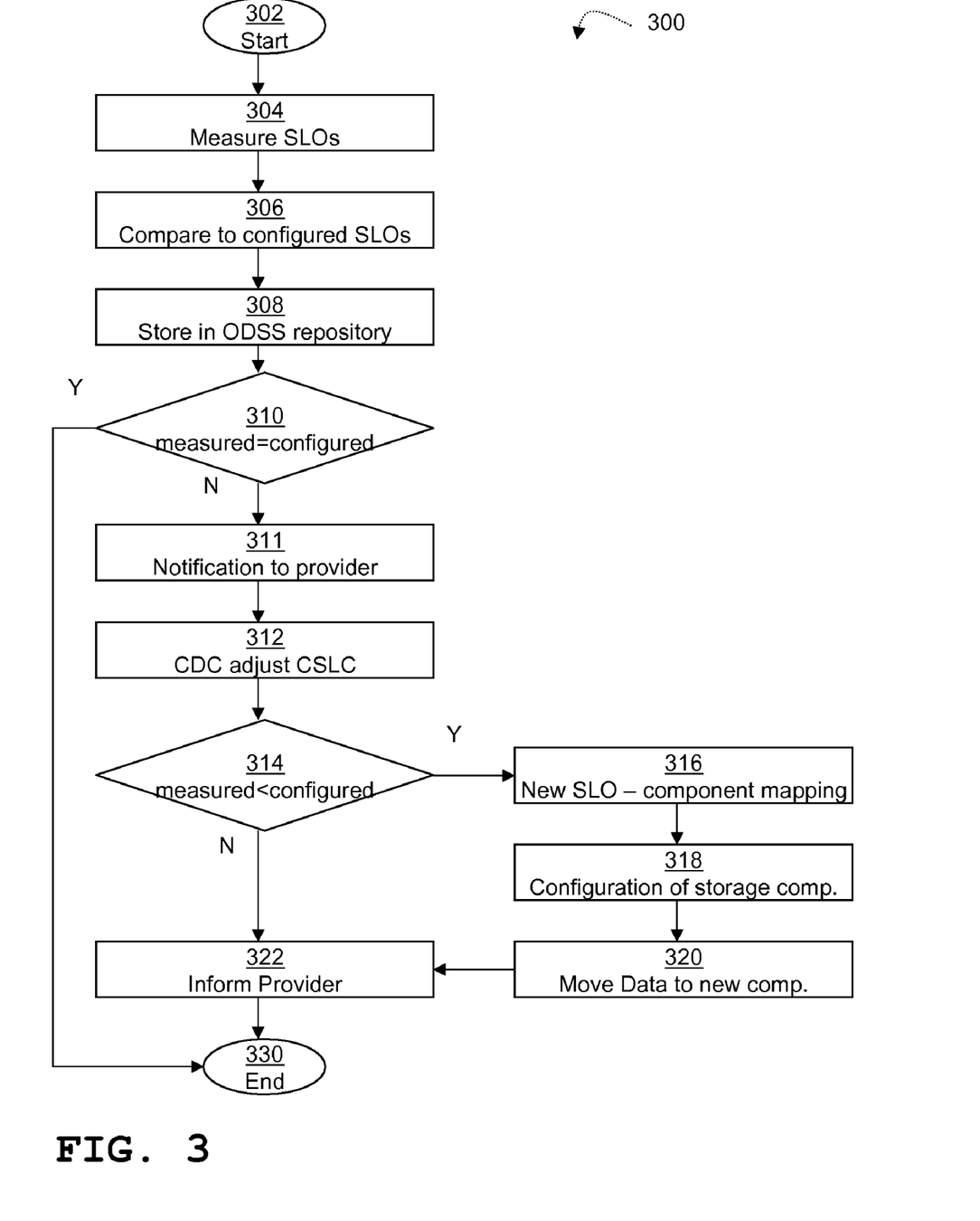
FIG. 3, shows a flowchart illustrating a process to measure SLO policies and handle SLO breaches.

The flowchart of FIG. 3 illustrates a process 300 for automated monitoring, metering and comparison of configured SLOs to actual SLOs. Besides, this process 300 comprises subsequent provider notification and adjustment of data placement and management based on SLO breaches.

Process 300 is provided by the ODSS management instance 204 of the ODSS 200 shown in FIG. 2. It starts in step 302 for a particular SLO policy or set of SLO policies. As explained above in connection with Table 2, each SLO policy is denoted by the data class, interface, service level objectives (SLOs) and capacity. These parameters are stored in the ODSS repository 206. The invocation of process 300 is configurable for each SLO policy or sets of SLO policies, e.g. for all SLO policies with identical data class. In a preferred embodiment of the present invention process 300 is invoked periodically, for example every minute, hour, day, week or month.

After invocation process 300 continues to step 304 where the actual SLOs are measured. The SLOs to be measured—part of an SLO policy—are obtained from the ODSS repository 206, where the consumer SLO policies are stored. The measurement of actual SLOs is based on well known methods such as reporting via SMI-S or other well known measurement tools, such as topas or nmon available for UNIX systems or other well known measurement tools provided by storage systems. The measurement may be done at the storage component 116 or at the consumer data interface 120. The measurement in step 304 produces tangible results.

From step 304 the process flows to step 306 where the SLO measurements of step 304 are compared to the SLOs configured with the consumer SLO policies. These are obtained from the ODSS repository 206.

In step 308 the measured SLOs and the result of the comparison of step 306 are stored in the ODSS repository 206 for reporting and chargeback purposes.

In step 310 the process determines whether the measured SLOs are equal to the configured SLOs. The comparison of the measured and configured SLOs may take into account some tolerances which are user-configurable and which are stored in the ODSS repository 206 as part of an SLO policy.

If the answer in step 310 is yes the process proceeds to the ending step 330 indicating that there was no SLO breach.

Otherwise, if the answer in step 310 is no the process flows to step 311 to further process the SLO breach detected. In step 311 the process notifies the provider about the SLO breach. The notification to the provider is done via provider interface 122 and can for example be based on e-mail, SNMP traps or SMI-S specific messages.

In step 312 the process informs the CDC component 208 about the SLO breach. The CDC component 208 updates the Component-Service Level Catalogue (CSLC) with the new SLO values measured in step 304.

In step 314 the process checks if the measured SLOs are smaller or worse than the configured SLOs. If the answer is yes the process flows to step 316 because immediate corrective action is required in order to achieve service level agreements (SLA). If the answer is no the process flows to step 322 explained later.

In step 316 the ODSS management instance 204 performs a new mapping of consumer SLO policies 210 to storage components 116 according to process 700 of FIG. 7. Thereby no configuration of the new selected storage component may be done in Process 700. And in step 318 the ODSS management instance 204 configures the storage components 116 based on the new mapping of consumer SLO policies 210 to storage components 116 resulting from step 316.

In step 320 all data which was stored on the storage components failing to deliver the required SLOs is moved to the newly configured storage components. Thereby, the data might be copied from one storage device to another using well known methods such as the copy command or logical volume mirroring. From step 320 the process flows to step 322.

In step 322 the provider is informed that there was an SLO breach detected including the measured and configured values. If the SLO breach was positive meaning that the measured values are greater than the configured values pertaining to an SLO the provider may get an extra notification. This is because the ODSS 200 delivers more than the customer expected. The provider may use this fact to inform the consumer about the improvements of the SLOs and ask if the customer wants to maintain these SLOs. If the consumer agrees to this then the according SLO policy must be adjusted with the newly measured values for the SLOs and stored in the ODSS repository 206. From step 322 the process flow to ending step 330.

In ending step 330 the consumer data interface 120 is configured to use the new storage components which have been configured in step 318. The process 300 ends here.

Figure 4:
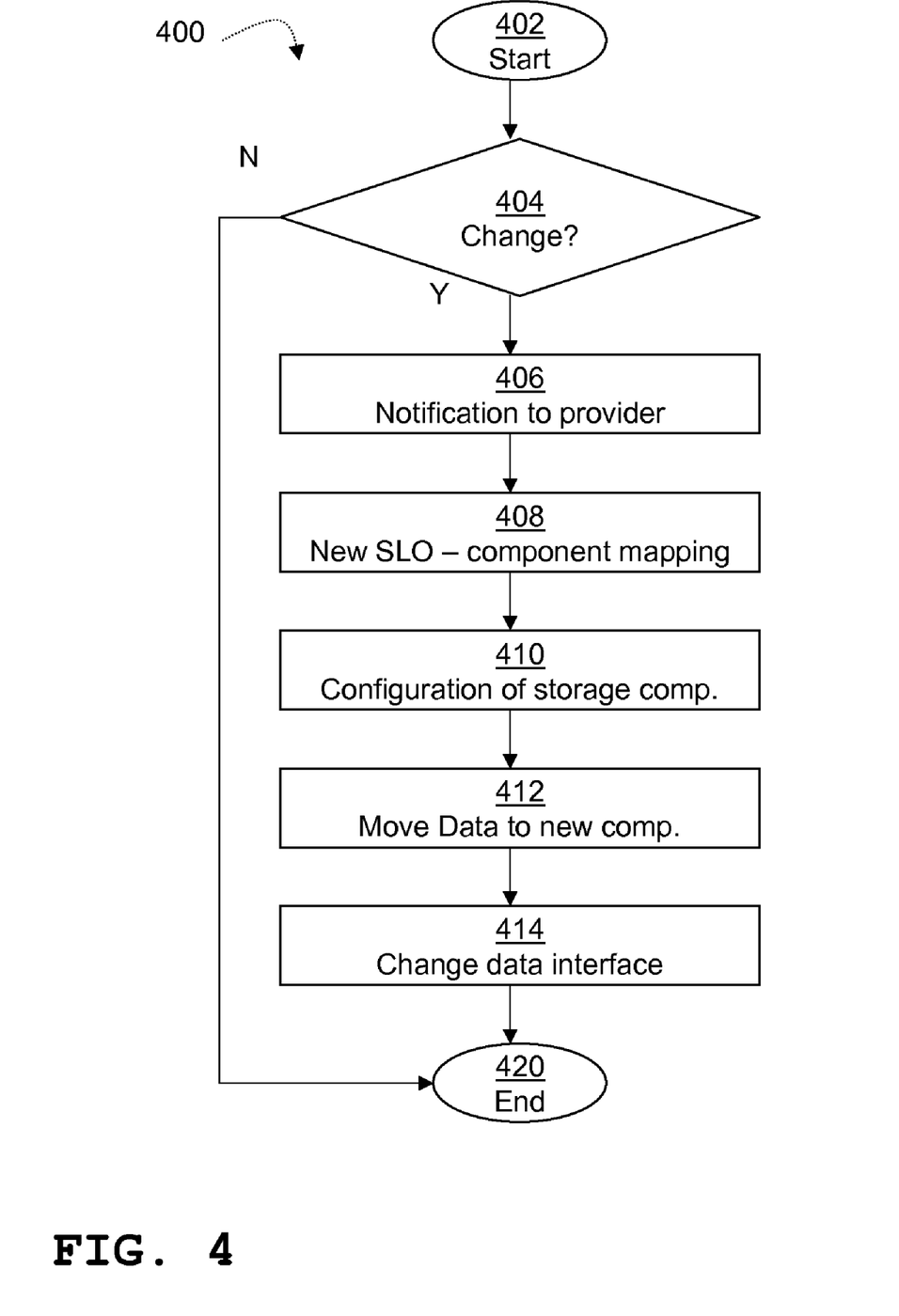
FIG. 4, shows a flowchart illustrating a process for SLO lifecycle management.

The flowchart of FIG. 4 illustrates a process 400 for automated Lifecycle management based on SLO changes.

Service levels (SLOs) may change over time as requested by the consumer through SLO policies 210 communicated via consumer SLO interface 202. For example Table 2 includes two SLO policies for e-mail data. The first policy applies to the initial storage of e-mails, the second policy is a lifecycle policy for e-mail data and indicates that the access time to e-mail data which is more than 1 year old can be up to 30 seconds.

Therefore, a method is provided determining when an SLO policy changes over time and applying that change to the ODSS system 200. This method is also provided by the ODSS management instance 204. This method is further explained in connection with process 400 illustrated in FIG. 4.

Process 400 starts in step 402 for a particular SLO policy or set of SLO policies. As explained above in connection with Table 2, each SLO policy is denoted by the data class, interface, service level objectives (SLOs) and capacity. These parameters are stored in the ODSS repository 206. The invocation of process 400 is configurable for each SLO policy or set of SLO policies, e.g. for all SLO policies with identical data class. In a preferred embodiment of an ODSS, process 400 is invoked periodically, for example every minute, hour, day, week or month.

After invocation process 400 continues to step 404 where the determination is made whether an SLO has to be changed. For example in Table 2 the SLO "access time" has to be changed after one year to allow data access within 30 seconds. So in step 404 the process 400 compares if any data pertaining to a SLO-policy is stored one year or longer. If the decision in step 404 is no the process flows to the ending step 420. Otherwise, if the decision in step 404 is yes the process flows to step 406. For example—according to Table 2—the decision is yes if one year has passed after the e-mail data has been stored in ODSS system 200.

In step 406 the process notifies the provider about the change of SLOs. The notification to the provider is done via provider interface 122 and can for example be based on e-mail, SNMP traps or SMI-S specific messages.

In step 408 the ODSS instance 204 performs a new mapping of consumer SLO policies 210 to storage components 116 according to process 700 of FIG. 7. Thereby no automated configuration of the selected storage component may be done in process 700 (step 715 may be omitted). And in step 410 the ODSS instance 204 configures the storage components 116 based on the new mapping of consumer SLO policies 210 to storage components resulting from step 408.

In step 412 all data which was stored on the old storage components is moved to the new storage components configured in step 410. Thereby the data might be copied from one storage device to another using well known methods such as the copy command or logical volume mirroring.

In step 414 the consumer data interface 120 is configured to use the new storage components which have been configured in step 410. The process 400 ends in step 420.

The automated generation of chargeback reports based on charging models is another aspect which may be provided by the ODSS 200 shown in FIG. 2.

Chargeback reports are used by the provider 110 to charge the consumer 104 for the service levels actually provided over a predefined period of time representing the billing cycle. Besides, chargeback reports take into account that different service levels are associated with different costs. Usually, the calculation of the costs to be charged is based on a charging-model created by the provider 110 and stored in the ODSS repository 206. So, the ODSS instance management component 204 is able to use the provider's charging-model and the measured actually provided service levels to create the chargeback reports. The actually provided service levels are measured periodically, e.g. by applying process 300, and stored in the ODSS repository 206. For a chargeback report only the data relevant for the billing period is retrieved from the ODSS repository 206. The chargeback reports may also be stored in the ODSS repository 206.

The following charging models are examples for calculating the total cost K:

Capacity based: Total cost K is proportional to the used capacity C in a given billing cycle. The proportion factor constant $k_c$ is defined in the charging model ($k_c$ is expressed in a currency such as Euro)

$$K = C * k_c \quad \text{(eqn 1)}$$

Configured SLO-and-Capacity based: Total cost K is based on the service levels which have been configured in association with the used capacity during a given billing cycle. Each configured service level $S_i$ is defined by a cost factor $kc_i$ which is stored in the charging model ($kc_i$ is expressed in a currency such as Euro)

$$K = C * (\text{sum } kc_i) \quad \text{(eqn. 2)}$$

Achieved SLO-and-Capacity based: Total cost K is based on the service levels which have been achieved in association with the used capacity during a given billing cycle. Each achieved service level $S_i$ is defined by a cost factor $ka_i$ which is stored in the charging model ($ka_i$ is expressed in a currency such as Euro)

$$K = C * (\text{sum } ka_i) \quad \text{(eqn. 3)}$$

Figure 5:
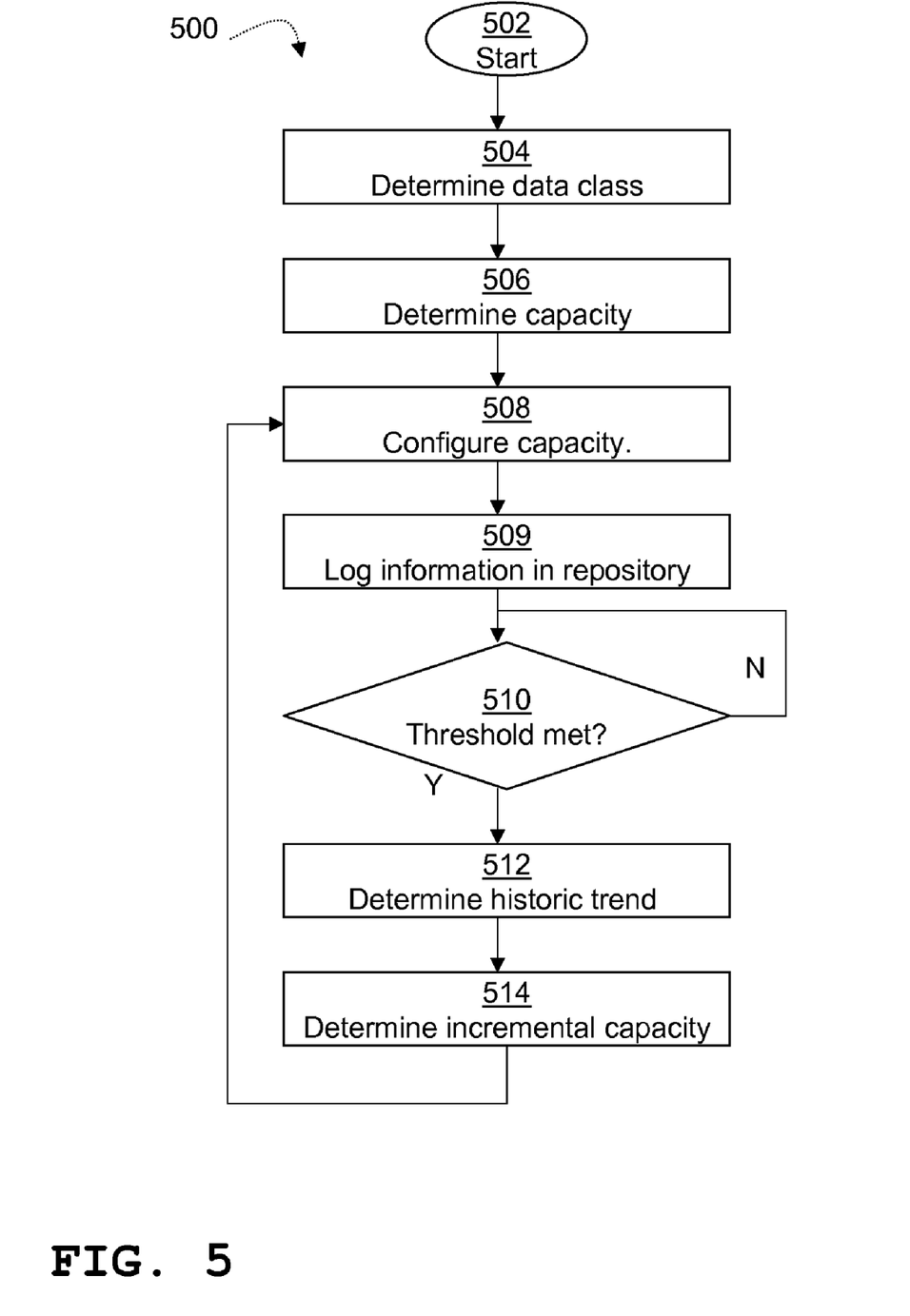
FIG. 5, shows a flowchart illustrating a process for just-in-time capacity provisioning.

The flowchart of FIG. 5 illustrates a process 500 for automated Just-in-Time capacity provisioning based on historic data and policies which may be provided by a preferred embodiment of the present invention.

Just-in-time capacity provisioning means that the ODSS system 200 provides some initial capacity based on the data class of a consumer SLO policy and increases the provided capacity when a certain threshold is met or when the historical data indicates that more storage capacity is required in the near future (trend-analysis). In the here described embodiment the amount of increase is based on increments which are calculated based on the actual trend. The advantage is that no storage capacity provided by storage components 116 is wasted. Since the data class is part of an SLO policy 210 which the consumer 104 passes through the consumer SLO interface 202 the ODSS system 200 and more precise the ODSS management instance 204 knows the class of data. For each data class the provider predefines the initial capacity to be provided.

Process 500 starts in step 502 where the ODSS management instance 204 receives a request to provide initial capacity for a certain class of data which is associated to the SLO policy 210. This request might be triggered by any process automatically configuring storage components such as step 318 of process 300 in FIG. 3, step 410 of process 400 in FIG. 4 and step 715 of process 700 in FIG. 7.

In step 504 the process determines the data class which is part of the SLO policy 210. In step 506 the process determines the initial capacity provided for the data class. The initial capacity is preconfigured and stored in the ODSS repository 206. And in step 508 the capacity determined in step 506 is configured at the storage component.

In step 509 the information about the amount of configured capacity and the date and time is stored in the ODSS repository 206. This information is used by the trend analysis in step 512.

In step 510 the decision is made whether the capacity is filled by more than a high-threshold. Such high-threshold might be configured to 80%. If the answer in step 510 is no the process returns to step 510 indicating that it is a repetitive process. Otherwise if the answer in step 510 is yes the process flows to step 512.

In step 512 the actual trend is determined. Determining the actual trend includes to review the last capacity increments and the capacity usage within these increments over time which are logged by step 509 in the ODSS repository 206. The analysis includes the determination of the date and time and the amount of incremented capacity.

In step 514 the process determines the amount of capacity to be incremented based on the historical information determined in step 512. This determination is based on well known processes such as the mean of the last three capacity increments plus 20%. From step 514 the process flows back to step 508 where the capacity determined in step 514 is configured. Note, the capacity determined in step 514 can also be zero indicating that no extra capacity must be configured.

Steps 508 to 514 of process 500 can be integrated with process 300 shown in FIG. 4 where a periodic SLO-measurement is performed. The steps can be performed within step 304 of process 300.

It should be pointed out, that Just-in-time capacity provision as described above is different from thin provisioning. Thin provisioning means that the capacity needed at a certain point of time is provisioned and configured during data transfer. Just-in-time provisioning according to this invention is not executed during data transfer but as a separate process and it takes historical information into account to configure appropriate capacity increments.

The invention claimed is:

1. A method for automatically identifying available storage components within a storage system, which are appropriate for storing consumer data in compliance with specified service level objectives (SLOs), comprising:
discovering available storage components;
identifying capabilities of each storage component of said available storage elements relative to said SLOs;
assigning service levels to each storage component of said available storage components;
storing resultant mapping of service levels to each storage component of said available storage components in a metadata repository; and
wherein said assigning service levels to each available storage component of said available storage components includes classifying the available storage components based on their physical type of technology and their SLO relevant capabilities.

2. The method according to claim 1, wherein the discovering of available storage components is based on an in-band or out-of-band inquiry.

3. The method according to claim 1, wherein SLO relevant capabilities of a given storage component are retrieved from technical specification of the storage component.

4. The method according to claim 1, wherein SLO relevant capabilities of a given storage component are provided on request by the storage component itself.

5. The method according to claim 1, wherein SLO relevant capabilities of a given storage component are determined by analyzing performance by executing automated test procedures and stored in said metadata repository.

6. The method according to claim 1, wherein the mapping of service levels to available storage components comprises for each of the storage components:
for each storage component of said available storage components a unique identification;
the physical type of storage technology;
at least one possible service level;
type of data interface; and
maximum capacity.

7. The method according to claim 1, including posting a notification to said provider in the event that assigning service levels to said a storage component of said available storage components failed for at least one of the available storage components and allowing said provider to manually assign a service level to said storage component.

8. The method according to claim 1, being repeated periodically to periodically update mapping of service levels to available storage components in the metadata repository.

9. The method according to claim 1, including:
measuring the service level of a configured storage component of said available storage components and comparing the measured service level to a consumer SLO for a data class to be stored on the measured storage component;
posting a notification to said provider in the event that the measured service level differs from the consumer SLO by more than a predetermined amount, said notification indicating an SLO breach has occurred; and
moving consumer data to a newly configured storage component of said available storage components if said SLO breach reduces the service level below that of the consumer SLO.

10. The method according to claim 1, being initiated in case of changes in the storage system configuration.

11. The method according to claim 1, including:
classifying the consumer data to be stored according to the consumer SLO policies specified for it;
determining an initial storage capacity for at least one consumer defined data class; and
configuring an initial storage capacity of the available storage component selected for storing consumer data of the consumer defined data class.

12. The method according to claim 11, including:
increasing storage capacity of the data class configured storage component when a predetermined amount of the capacity of said configured storage component is used.

13. The method according to claim 12, including:
tracking variations of actual utilisation of the data class configured storage component over a given time period to determine an amount of said capacity increase.

14. The method of claim 1, wherein said physical type of storage components are selected from the group consisting of fiber channel, disk and tape.

15. The method of claim 1, including:
discovering at least two different physical types of available storage components.

16. A storage infrastructure comprising:
- storage components for storing consumer data under consideration of consumer specified service level objectives (SLO) for consumer specified data classes;
- a consumer data interface configured to transfer consumer data from a consumer to said storage components and configured to transfer consumer data from said storage components to said consumer;
- a consumer SLO interface configured to send consumer defined SLO policies from said consumer to an on demand storage system (ODSS) management unit, said ODSS management unit configured to automatically map said consumer SLOs to said storage components based on information stored in an ODSS repository;
- a provider interface configured to provide communication a provider and a component discovery and classification unit (CDC); said CDC unit configured to discover and classify said storage components, associate individual storage units with service levels said store metadata representing said individual storage components and service levels on said ODSS repository; and
- wherein said storage infrastructure is provided and managed by said provider and used by said at least one consumer.

17. The storage infrastructure according to claim 16, further comprising:
- means for classifying the consumer data to be stored according to the consumer SLO policies specified for it;
- means for determining an initial storage capacity for at least one consumer defined data class; and
- means for configuring an initial storage capacity of the available storage component selected for storing consumer data of the consumer defined data class.

18. The storage infrastructure of claim 16, wherein said ODSS management unit assigns specific storage components of said storage components to said consumer based on matching said consumer specified SLOs with service levels of said storage components stored in said ODSS repository.

19. The storage infrastructure of claim 16, wherein:
- discovered storage components and associated consumer SLO polices are stored in said ODSS repository as a component services level catalog (CSLC);
- said ODSS management unit configured to automatically configure said storage components according to said consumer specified SLO policies, monitor said consumer data interface and said storage components to verify said consumer specified SLO policies are met, to take corrective action if said consumer specified SLO policies are not met, and to perform dynamic changes to assignment of storage components when said consumer specified SLO polices are changed by the consumer.

20. A computer program product stored on a computer usable medium, comprising computer readable program means for causing a computer system to perform a method for automatically identifying available storage components within a storage system, which are appropriate for storing consumer data in compliance with specified service level objectives (SLOB), the computer program product comprising:
- computer usable program code for discovering available storage components;
- computer usable program code for identifying capabilities of each storage component of said available storage elements relative to said SLOs;
- computer useable program code for assigning service levels to each storage component of said available storage components;
- computer usable program code for storing resultant mapping of service levels to available storage components in a metadata repository; and
- wherein said assigning service levels to each available storage component of said available storage components includes classifying the available storage components based on their physical type of technology and their SLO relevant capabilities.

* * * * *